US006926873B1

(12) United States Patent
Filippi et al.

(10) Patent No.: US 6,926,873 B1
(45) Date of Patent: Aug. 9, 2005

(54) REACTOR IN PARTICULAR FOR EXOTHERMIC REACTIONS

(75) Inventors: Ermanno Filippi, Castagnola (CH); Enrico Rizzi, Grandate (IT); Mirco Tarozzo, Ligornetto (CH)

(73) Assignee: Methanol Casale S.A., Lugano-Besso (CH)

( * ) Notice: Subject to any disclaimer, the term of this patent is extended or adjusted under 35 U.S.C. 154(b) by 0 days.

(21) Appl. No.: 10/009,773

(22) PCT Filed: May 12, 2000

(86) PCT No.: PCT/IB00/00636
§ 371 (c)(1),
(2), (4) Date: Apr. 22, 2002

(87) PCT Pub. No.: WO00/76653
PCT Pub. Date: Dec. 21, 2000

(30) Foreign Application Priority Data

Jun. 15, 1999 (EP) .................................. 99111538

(51) Int. Cl.⁷ ............................................... F28D 7/02
(52) U.S. Cl. ..................... 422/198; 422/200; 422/201; 165/163
(58) Field of Search ............................ 422/146, 173, 422/198, 200, 201, 211; 165/156, 163

(56) References Cited

U.S. PATENT DOCUMENTS

| 2,248,993 | A | * | 7/1941 | Houdry ..................... 422/200 |
| 3,663,179 | A |   | 5/1972 | Dinshaw et al. |
| 4,339,413 | A | * | 7/1982 | Lahne et al. ................ 422/200 |
| 4,636,365 | A |   | 1/1987 | Link et al. |
| 4,714,592 | A | * | 12/1987 | Zanma et al. ............... 422/192 |
| 5,080,872 | A | * | 1/1992 | Jezl et al. ................... 422/201 |
| 2002/0085969 | A1 | * | 7/2002 | Filippi et al. |

FOREIGN PATENT DOCUMENTS

| AT | 362 397 B | 5/1981 | |
| DE | 855 258 C | 9/1952 | |
| DE | 3 318 098 A1 | 11/1984 | |
| DE | 37 08 957 A | 10/1988 | |
| EP | 0 534 195 A | 3/1993 | |
| EP | 0 534 195 A1 | * 3/1993 | ............. B01J 8/02 |
| FR | 841 683 A | 5/1939 | |
| GB | 391 444 A | 4/1933 | |
| GB | 1 270 568 A | * 4/1972 | ............. F28D 7/02 |
| GB | 2 204 055 A | * 11/1988 | ............. C07C 1/04 |
| WO | WO 94 12274 A | 6/1994 | |

OTHER PUBLICATIONS

Ulrich Lahne & Reiner Lohmuller: "Schuttschichtreaktoren mit gewickelten Kuhlrohren, eine konstruktive Neuentwicklung zur Durchfuhrung exothermer katalytischer Prozesse", Chemie. Ingenieur. Technik., vol., 58, No. 3, 1986, pp. 212–215, XP002124824, Verlag Chemie GmbH. Weinheim., DE ISSN: 0009-286X.

* cited by examiner

Primary Examiner—Kevin P. Kerns
(74) Attorney, Agent, or Firm—Sughrue Mion, PLLC (57) ABSTRACT

A reactor, in particular for exothermic reactions, of the type including: a shell (2) of substantially cylindrical shape, at least one catalytic bed (3) in the shell, including a perforated cylindrical outer side wall (4), which forms a free space (8) with the shell, and an inner side wall (5) coaxial to the previous one, a heat exchanger (13) in the bed (3), the heat exchanger (13) being formed by a plurality of tubes (15) in the form of a spiral, a coil or alike in fluid communication with feed and discharge collectors (14, 16) for a cooling fluid.

10 Claims, 6 Drawing Sheets

REACTOR IN PARTICULAR FOR EXOTHERMIC REACTIONS

DESCRIPTION

1. Field of Application

The present invention relates to a reactor, in particular for exothermic reactions, of the type comprising:
- a shell of substantially cylindrical shape;
- at least one catalytic bed in the shell, comprising a perforated cylindrical outer side wall, which forms a free space with said shell, and an inner side wall coaxial to the previous one;
- as well as a heat exchanger in said bed, said heat exchanger being formed by a plurality of tubes shaped as spiral, coil or alike in fluid communication with feed and discharge collectors for a coolant fluid.

In this specific technical field, this kind of reactors is generally referred to with the term "isothermal reactors" or "pseudo isothermal reactors", thus meaning reactors inside which the temperature of the catalytic bed(s) wherein the reaction takes place remains substantially constant or controlled according to a predetermined profile during both the exothermic and endothermic process steps.

Reactors of this type are for example used for the synthesis by means of exothermic reactions of chemical substances, such as for example methanol or formaldehyde. Such reactors may be also used for the synthesis of chemical substances obtained through endothermic reactions, such as for example styrene.

For this field of application, the need is more and more felt of realizing isothermal reactors with a good yield and reliability, which are also of simple construction with low investment and maintenance costs. These features must, however, be compatible with a capability of operating with low pressure drops, low energy consumption and high heat exchange efficiency between the reactants and the cooling or heating fluid.

2. Prior Art

The state of the art already proposes a number of solutions in order to try to fulfil the above mentioned requirements. For example, various types of isothermal reactors have been proposed with catalytic beds of radial type including a plurality of tubes for heat exchange provided vertically and arranged in a dense pattern.

An example of such reactors is described in the German Patent Application DE-A-3 318 098 in which a reactor comprising a bundle of tubes for heat exchange is foreseen, which are arranged according to a helicoidal form which extends vertically around an axial collector. It shall be noted that helicoidal arrangements for tubes for heat exchange are also known in isothermal reactors with axial catalytic bed, as described, for example, in the patents U.S. Pat. No. 4,339,413 and U.S. Pat. No. 4,636,365.

Although advantageous as far as some aspects are concerned, in that the radial configuration of the catalytic bed allows obtaining in an easy and economical way high production capacities with low pressure drops and low energy consumption, with respect to a bed of axial type, the isothermal reactor in the above mentioned German application has a number of drawbacks which are listed hereinbelow.

First of all the tube distribution, in the form of a helicoidal tube bundle does not allow adapting itself effectively to the mode of heat release or absorption from the flow of gaseous reactants which crosses the catalytic bed with radial motion. In fact the flow of gas that flows perpendicularly with respect to the vertical arrangement of the helicoidal tubes, comes into contact—when crossing the catalytic bed—with various tubes at different temperatures, and this causes a low heat exchange efficiency between the gaseous reactants and the heat exchange fluid.

In other words, in case of an exothermic reaction with the gaseous reactants flowing with a radial motion through the catalytic bed, the outer helicoidal tubes are impinged with a gas that has just started reacting, and hence releases a low amount of heat, whereas the inner helicoidal tubes are impinged with a gas from which they receive an increasingly greater amount of heat up to a point where the heat released from the reaction gas is at a maximum. From that point on, the temperature decreases and hence the amount of heat received by the helicoidal tubes arranged in proximity of the gas outlet wall of the catalytic bed decreases.

It results that each helicoidal tube receives a different amount of heat and hence has to withstand a different thermal load. This causes a bad distribution of the temperatures inside the catalytic bed thus decreasing the heat exchange efficiency.

For example, whenever hot water flows inside the tubes for removing the reaction heat, water that is transformed into steam, it is clear that with the helicoidal tube bundle arrangement each respective tube produces a different amount of steam. This implies relevant problems of control and of supply/withdrawal of cooling fluid in correspondence of the tube plates, as well as a bad distribution of water and steam inside such tubes.

To this respect, it is worth noting that all the tubes of the isothermal reactors described in DE-A-3 318 098 are parallel to each other. Therefore the available pressure drop for each helicoidal tube is the same.

In DE-A-3 318 098, the helicoidal tubes in contact with the gaseous reactants at low temperature are subjected to a low thermal load, which implies a low degree of vaporization for the water thus producing low water outflow speed and hence high flow rates, in terms of mass. On the contrary, the helicoidal tubes in contact with the high temperature gaseous reactants are subjected to a high thermal load, which implies a high degree of vaporization for the water and ensuing high water outflow speed and hence low flow rates, in terms of mass.

Therefore, when the reactor is operating, a situation occurs in which the helical tubes subjected to a high thermal load are those fed with less water and tend therefore to have an ever increasing degree of vaporization and an ever decreasing capability of heat removal. This implies a far from optimum temperature distribution inside the catalytic bed in case of moderately exothermic reactions as the methanol synthesis, whereas in case of fast and strongly exothermic reactions such as the formaldehyde synthesis it may even bring to temperature overshoots.

Furthermore, the excessive vaporization enhances the formation inside the tubes of deposits of residues present in the water, thus affecting their heat exchange efficiency. All these disadvantages are independent from the fact that the tubes are arranged at a more or less close distance between each other according to the temperature profile of the gaseous reactants inside the catalytic bed.

A further disadvantage of the reactor according to the prior art is the relevant structural and manufacturing complexity resulting from the helicoidal design of the tube bundle that requires high investment and maintenance costs.

Just because of these disadvantages, the isothermal reactors for carrying out exothermic or endothermic heterogeneous syntheses with a radial catalytic bed and a helicoidal or vertical tube bundle have found to date little practical application, notwithstanding the increasingly felt need in the field of the high capacity reactors.

A further known technical solution is described in the German Patent Application DE-A-3 708 957 in which, in an embodiment thereof, reference is made to a isothermal reactor of the type comprising a shell of substantially cylindrical shape, at least a catalytic bed in the shell, comprising an outer cylindrical unperforated side wall and an inner side wall coaxial to the unperforated previous one and a perforated annular bottom. Further on, a heat exchanger is foreseen in the catalytic bed, which heat exchanger is formed by a plurality of tubes having the form of a spiral arranged transversally to the shell axis, said tubes being in fluid communication with feed and discharge collectors for a cooling fluid.

As in the above known technical solution, this structure for a reactor is difficult to carry out with low investment costs. The complexity of the heat exchanger does not allow repairing possible damages, which should occur inside the reactor during its operation.

Further on, the gaseous reactants flow inside the bed in a transversal way with respect to the spiral-shaped tubes for the passage of the cooling fluid, and, therefore, the heat exchange between the fluids has the same above listed drawbacks.

The technical problem underlying the present invention is that of providing an isothermal or pseudo-isothermal reactor for carrying out exothermic or endothermic heterogeneous reactions, which has structural and functional features such to allow a simple and reliable realization, that requires low investment and maintenance costs and allows operating with low mechanical loads on the internals and with a high heat exchange efficiency between the reactants and the cooling or heating fluid.

SUMMARY OF THE INVENTION

The resolutive idea at the basis of the present invention is that of foreseeing a plurality of modular units formed by groups of tubes wound as a spiral, a coil or alike and each forming a portion of heat exchanger, modular units which can be superimposed and stacked the one on the other on site and connected to feed and discharge collectors for the cooling/heating fluid.

On the basis of such resolutive idea, the technical problem is solved, according to the invention, by a reactor of the previously indicated type and characterized in that the heat exchanger comprises a plurality of superimposed and structurally independent modular units, each of them including at least two tubes formed as a spiral, a coil or alike provided transversally to the axis of the shell and wrapping around a corresponding portion of said inner side wall of said catalytic bed, and provided with respective connecting portions to said feed and discharge collectors.

Thanks to the present invention, it is possible to realize, in a simple an effective way, an isothermal or pseudo-isothermal reactor with a high heat exchange coefficient, to all advantage of the conversion yield and of the energy consumption.

In fact, according to the present invention, each single tube for removing or supplying heat extends along a plane substantially perpendicular with respect to the perforated side walls.

In this way, the tubes are advantageously arranged in a substantially parallel way with respect to the flow comprising reactants and reaction products.

This means that each single tube is in contact with a same portion of reactants and follows every heat variation thereof, and hence the temperature profile of said portion of reactants from the inlet to the outlet of the catalytic bed. Accordingly, whenever a plurality of tubes according to the present invention is arranged inside the catalytic bed(s), each of them would have to withstand the same thermal load, removing or supplying the same amount of heat to all advantage of the heat exchange efficiency of the catalytic bed and of the conversion yield.

The reactor according to the invention allows recovering or supplying heat at a higher thermal level, thus resulting in an increase of heat exchange efficiency and of the conversion yield. Or, the conversion yield being the same, with respect to the prior art, the increase of the heat exchange efficiency allows decreasing the volume of catalyst required, with ensuing savings in terms of room and investment costs.

A further advantage of the present invention consists in that, when a plurality of tubes is arranged inside a catalytic bed, the tubes may be supplied all from a same source as—all being subjected to a same thermal load—there are no control problems for supplying and withdrawing the cooling/heating fluid.

Finally, it shall be noted that the reactor according to the present invention is particularly simple to realize and does not require using tube plates with ensuing relevant savings in terms of investment and maintenance costs.

The features and advantages of the reactor according to the invention will become clearer from the following description, of an indicative and not limiting example of an embodiment provided with reference to the attached drawings.

In such drawings:

DETAILED DESCRIPTION

With reference to such figures, an isothermal or pseudo-isothermal reactor realized according to the present invention for carrying out exothermic and endothermic heterogeneous reactions is referred to in its whole and schematically with numeral 1.

Reactor 1 comprises an outer shell 2 of substantially cylindrical shape, which extends vertically and is closed at the bottom and open at the top. Inside shell 2 there is housed a catalytic bed or basket, generally indicated with 3.

A closing cover 46 (FIG. 5) is foreseen for closing the entrance of the shell 2 at the end of the construction phase at site that foresees the assembly and/or loading of the catalyst.

Figure 5:
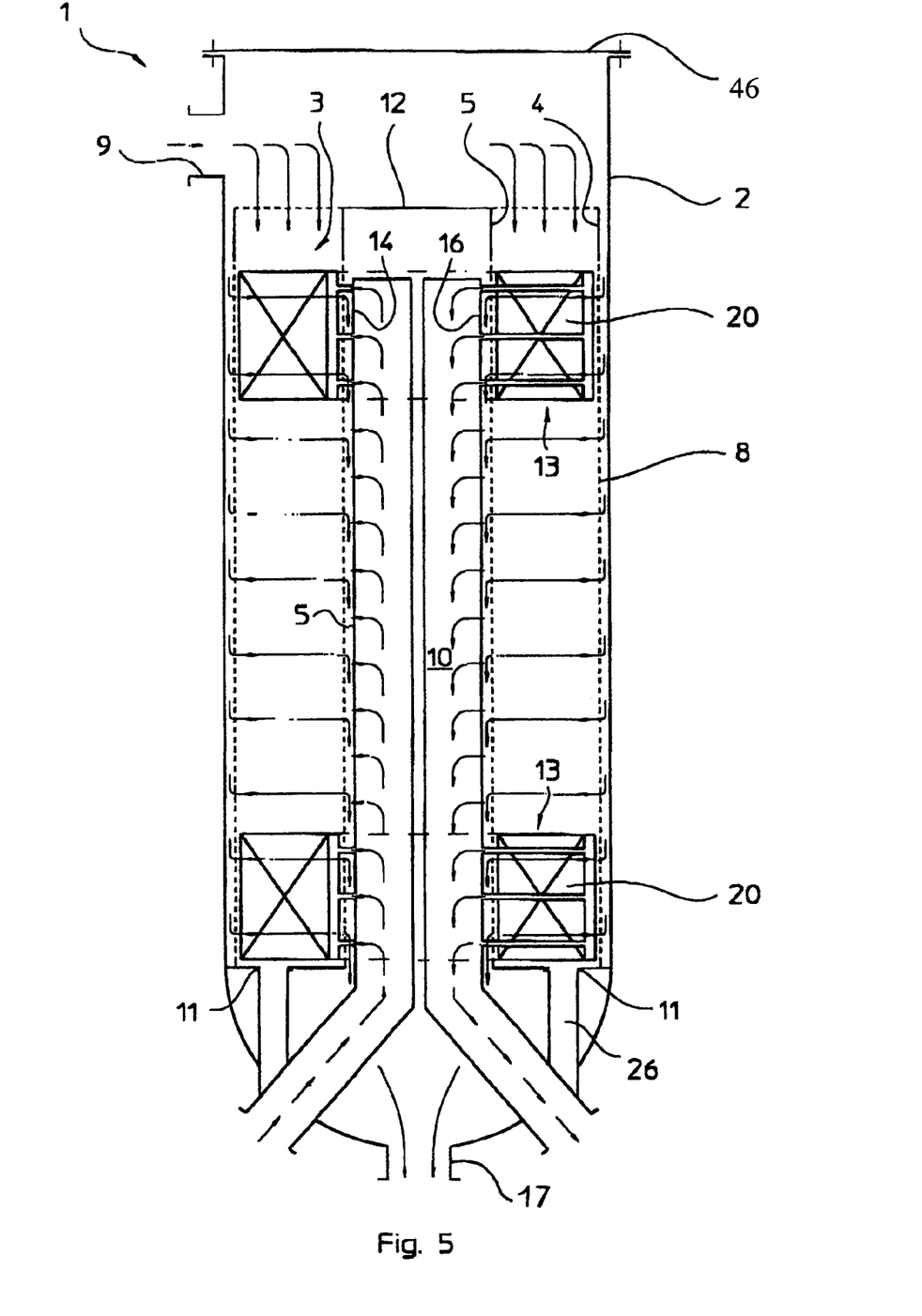
FIG. 5 shows a schematic view in longitudinal section of the isothermal reactor of FIG. 1.
Figure 6:
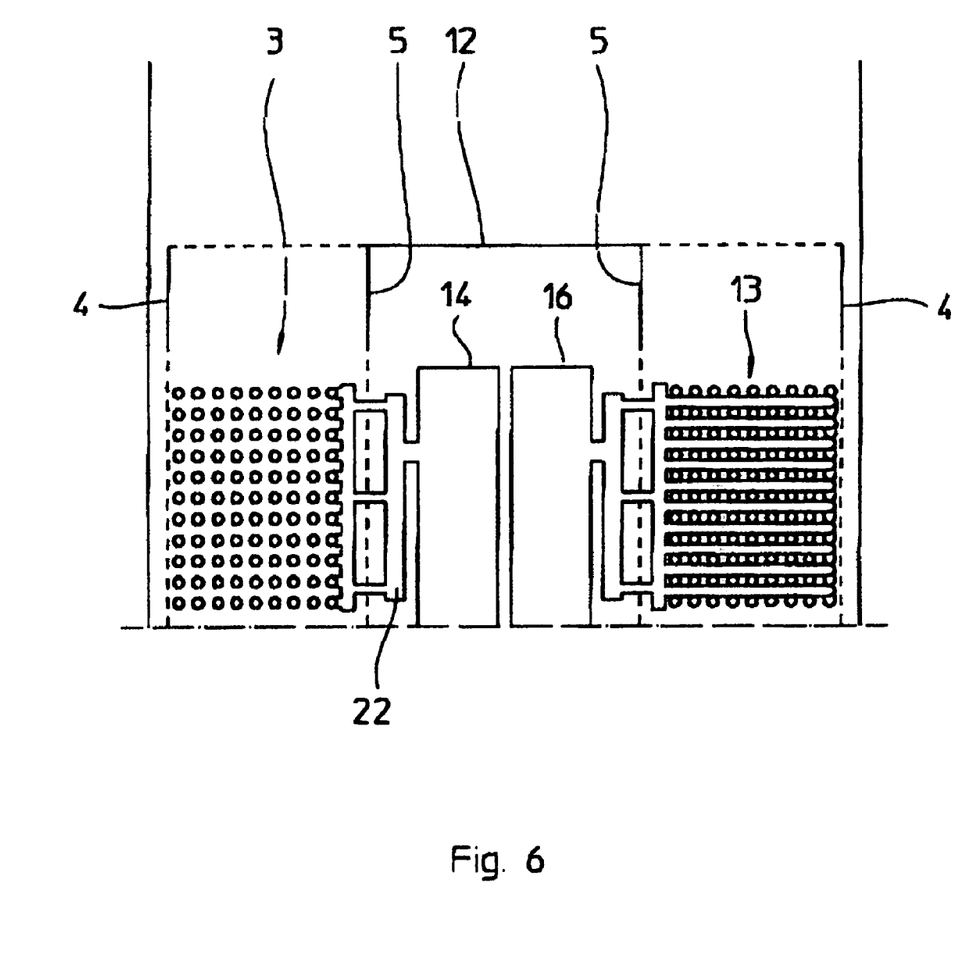
FIG. 6 shows a schematic view, in longitudinal section and enlarged scale, of a detail of the top of the reactor according to the invention.

The catalytic bed 3 is bounded sideways by opposed cylindrically shaped outer and inner perforated walls 4 and 5, respectively, which allow the inlet of a flow comprising reactants and the outlet of a flow comprising the reaction products, as schematically shown in FIG. 5.

The cylindrical walls for containing the catalyst may be realized with different known constructive solutions consisting for example of walls, which are punched, perforated, covered with metallic mesh or of simply perforated sheets.

Generally, the substances, which are fed to the reactor 1, are in gaseous phase. Accordingly, in the following description, the expressions "flow comprising reactants" and "flow comprising reaction products" is meant to indicate a flow of gaseous reactants and a flow of gaseous reaction products, respectively.

However, it is clear that the reactor according to the present invention may be employed even for reactions in liquid or liquid/gas phase.

In the present example, as a matter of indication only, the perforated walls 4 and 5 are permeable to the gases so as to allow the inlet into the catalytic bed 3 of the flow of reactant gases and the outlet of the flow of gaseous reaction products, respectively.

The catalytic bed 3 is further bounded in its lower part by a bottom 6 not permeable to gases, which is supported in correspondence of the reactor bottom, even if it does not correspond with it. The catalytic bed might be even hanged to the shell, although this would not modify the features of the invention.

Advantageously, in the shell 2 a side nozzle 9 is provided for the inlet of the reaction gas, which is arranged above the catalytic bed 3 in proximity of the entrance of the shell 2. According to the requirements, further feed nozzles might be provided. The absence of nozzles on the cover 36 of the high pressure shell 2 is made possible by the structural features of the reactor according to the invention that will be clear in the following description.

At least a pair of holes 11, arranged in diametrically opposite position, puts in communication the bottom 6 of the catalytic bed 3 with respective discharge ducts 26 of the bed 3 itself. Such ducts 26 lead into respective nozzles 30.

The number of holes 11 may even be higher according to the discharge requirements or to the design of the shell bottom.

In order to allow a correct axial-radial crossing of the catalytic bed 3, with the radial portion being more relevant than the axial portion, the inner side wall 5 may have a short portion unperforated and impermeable to gases which extends from an upper end of the same. As known, a catalytic bed of the radial type, and even more remarkably, a catalytic bed of the axial-radial type are particularly advantageous in that they allow obtaining high conversion yields and at the same time low pressure drops of the gaseous reactants, rendering the use of more active and low particle size catalysts possible.

Between the shell 2 and the outer side wall 4 of the catalytic bed an annular free space 8 is provided for achieving an optimum distribution and feed of the gaseous reactants into the catalytic bed 3 and defines a kind of outer feed collector for the gases. To this end, the free space 8 is in fluid communication with the nozzle 9 for the gas inlet at the side top of the reactor 1.

In turn, the side wall 5 defines an inner duct 10, substantially coaxial to the reactor axis, for collecting and discharging from the reactor 1 the flow of reacted gases; such duct 10 is a discharge inner collector for the gases. To this end, the duct 10 is tapered in its lower part and in fluid communication with a nozzle 17 for the gas outlet. In its upper part, the duct 10 is closed by a baffle 12.

To allow the removal or supply of heat to the gas flowing inside the catalytic bed 3, so to maintain the reactor 1 in a pseudo isothermal condition, or with a predetermined temperature profile, a heat exchanger 13 is housed in the catalytic bed 3 for the passage of a cooling/heating fluid. Such exchanger 13 is comprises a plurality of tubes 15 in the form of a spiral, a coil or alike arranged transversely with respect to the axis of the shell; these tubes 15 are in fluid communication with feed and discharge collectors 14 and 16, respectively, for the cooling/heating fluid. In a preferred embodiment, the tubes 15 are in the form of a flat spiral.

The spiral design of the tubes 15 is particularly advantageous both in terms of heat exchange efficiency, and in terms of constructive simplicity and flexibility. In fact, a tube shaped as a spiral may adapt itself to any of the various sizes which a catalytic bed 3 may take on and in particular is capable of covering all areas of the bed itself, thus achieving an effective heat exchange in any portion of the bed.

Further on, according to the amount of heat to be removed or to be supplied, the spiral tube 15 may be designed with more or less close turns, i.e. with multi-principle spirals.

For example, a spiral tube may be realized with a constant winding pitch, that is to say an equal distance between the various turns along the complete spiral. Anyway, particularly advantageous results have been obtained by varying the winding pitch according to the variation of the radius of the spiral, so to adapt it to the temperature profile of the gaseous reactants inside the catalytic bed 3, following all its thermal variations.

As an alternative, the use of coil-shaped tubes may be taken into consideration; such expression is used to indicate substantially curvilinear tubes or tubes having an alternate pattern of curvilinear and rectilinear portions.

In this instance, the distance between the various turns varies according to the variation of the radius of the spiral, and, preferably, the winding pitch is made decrease as the radius of the spiral increases. In order to take into account in an optimal way the different distribution of the flow of gaseous reactants inside the catalytic bed 3, specifically in the case of an axial-radial bed, tubes 15 may even be arranged at a distance which varies from one plane of two adjacent tubes to the other.

In doing so, it is possible to adapt the distance of the tubes 15 according to the amount of heat to be removed or supplied; in other words following the temperature profile inside the catalytic bed 3, to all advantage of the degree of heat exchange efficiency, which favourably reflects on the conversion yield and energy consumption.

In this way it is possible to obtain a greater concentration of tubes 15, with a closer distance between the planes of two adjacent tubes, where a greater flow rate of gaseous reactants and hence greater thermal loads occur, and a lower concentration of tubes 15, with a greater distance between the planes of two adjacent tubes, where a lower flow rate exists.

The cooling or heating fluid is supplied to the tubes 15 through the feed collector 14 which is in fluid communication with one or more of the inlet nozzles 18. The same fluid is extracted from the tube 15 through the discharge collector 16 that is in fluid communication with one or more of the outlet nozzles 19.

Advantageously, according to the invention, the collectors 14 and 16 extend parallel and housed inside the duct 10 bounded by the inner side wall 5 of the catalytic bed 3. In its lower part, the collector 14 leads to the nozzle 18, whereas the collector 16 leads to the nozzle 19.

According to a particularly advantageous aspect of the present invention, the tubes 15 for removing or supplying heat extend in the form of a spiral, coil or alike, preferably in the form of a flat spiral, inside the catalytic bed 3 along a plane substantially transversal to the axis of the reactor 1 and to the side walls 4 and 5.

In the following description and attached claims, the term "tube in the form of a flat spiral" is meant to indicate a tube substantially wounded as a spiral along a plane with a pitch which is constant or follows any possible geometrical progression. The spirals may be approximated by any possible number of arcs of circle.

In this way, each tube 15 is impinged for its entire length by a same portion of the reactant gases, thus following all their temperature variations, and hence their temperature profile, from inlet to outlet of the catalytic bed 3.

Further on, tubes 15 arranged in the form of a spiral on respective planes substantially parallel to each other, all undergo the same thermal load and accordingly operate in the same way. This implies an optimum temperature distribution inside the bed 3, without the risk of temperature overshoots, and an effective heat exchange between the gaseous reactants and the cooling or heating fluid to all advantage of the conversion yield and of the energy consumption.

It is also important to note that the tubes 15 extend inside the catalytic bed 3 along a plane substantially parallel with respect to the direction of crossing of the catalytic bed by the flow of gaseous reactants.

Figure 1:
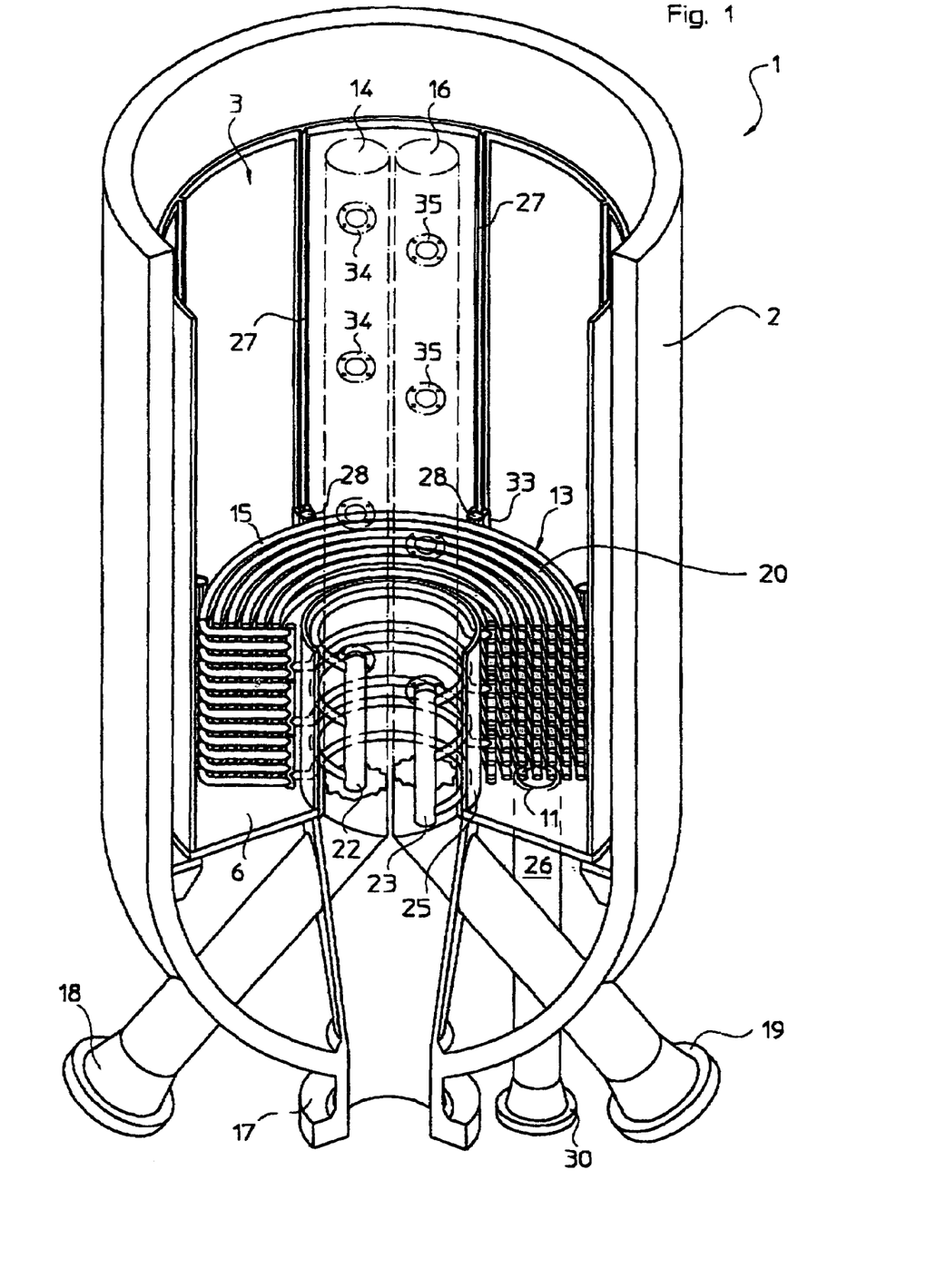
FIG. 1 shows a perspective exploded schematic view of an isothermal reactor for carrying out exothermic or endothermic heterogeneous reactions according to an embodiment of the present invention.

In the example of FIG. 1, the shell 2 is arranged in vertical and the tubes 15 extend in the form of a spiral inside the catalytic bed along planes substantially transversal to the axis of the shell.

Still more advantageously, the heat exchanger 13 comprises a plurality of modular units 20 which are superimposed on one another and structurally independent; each unit 20 includes at least two tubes 15 in the form of a flat spiral which wrap around a respective portion 25 of the inner side wall 5 of the catalytic bed 3.

In the example of FIG. 1, only the first modular unit 20 is shown, that is housed on the bottom 6 of the catalytic bed 3.

The planes of the spirals transversal to the axis of the reactor may be arranged at the same distance or at varying distance.

Figure 2:
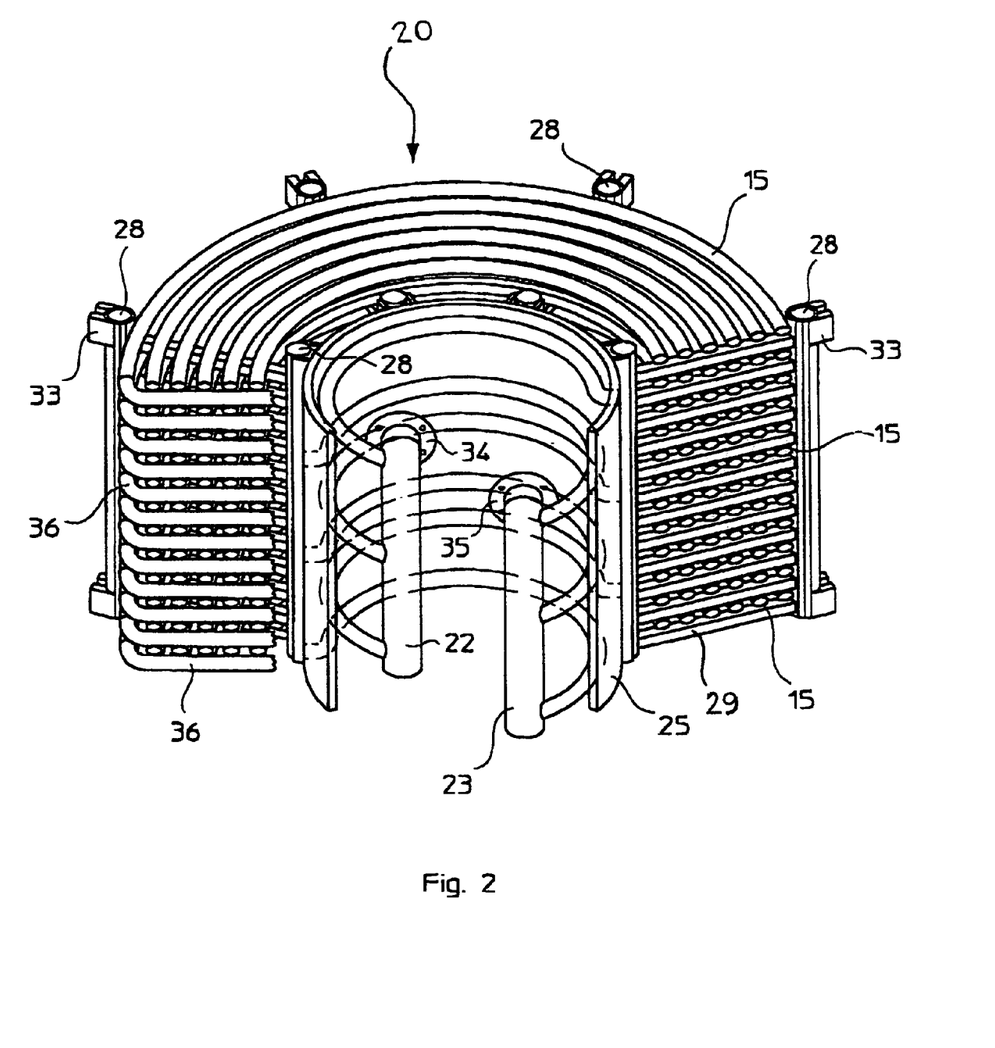
FIG. 2 shows a perspective and schematic view of a component of the reactor in FIG. 1.

The tubes in the form of a flat spiral, coil or alike are housed in a cage structure having substantially the form of a basket, as shown in FIG. 2, where it can be appreciated that each modular unit 20 further comprises an inner portion 25 of perforated cylindrical wall that builds up a piece or portion of said inner side wall 5 of said catalytic bed 3.

According to a potential embodiment, each modular unit could comprise also an outer portion of perforated cylindrical wall building up a piece or portion of said outer side wall 4 of said catalytic bed. In this way, not only the inner side wall 5 but also the outer side wall 4 of the catalytic bed 3 would be formed by the superimposition of the modular units 20.

Each single turn of a modular unit 20 lays on a predetermined number of radially extending supports. Such supports may form part of a star-shaped metal structure of the self-supporting type or may be simply laying on the spiral underneath.

Figure 7:
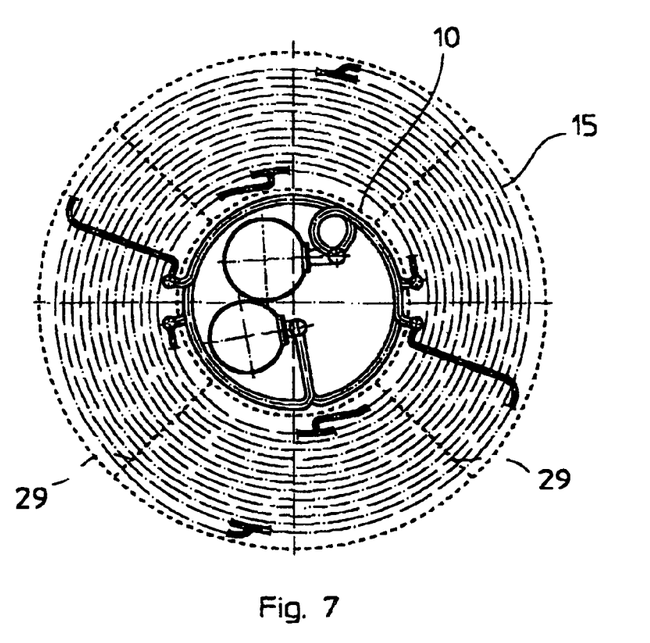
FIG. 7 shows a top view of a heat exchanger included in the reactor of FIG. 1.
Figure 8:
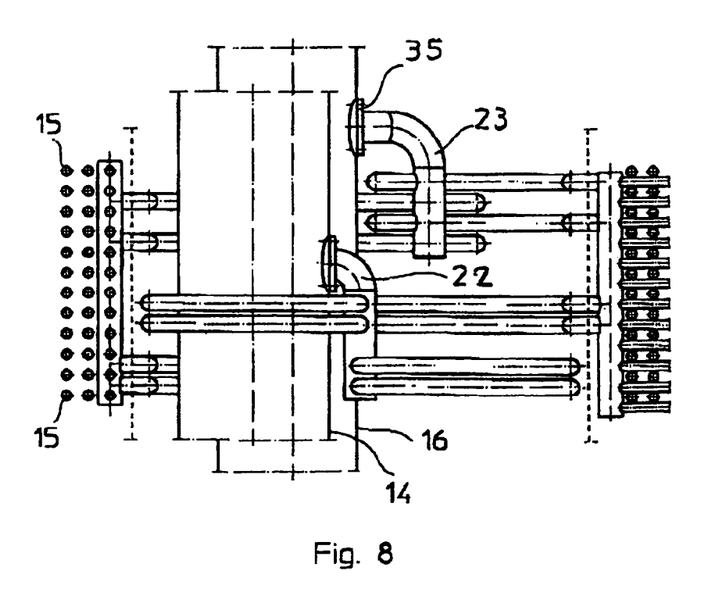
FIG. 8 shows a schematic and longitudinal view of a detail of the heat exchanger of FIG. 7.

Advantageously, as schematically shown in FIG. 7, the aforesaid support star-shaped metal structure for the spirals is formed by rays 29 hinged at their opposed ends to uprights 28 in the form of rods which allow a variation of the position of the spirals from flat to conical as a result of the temperature difference which develops during the operation of the reactor between outer and inner collector.

Figure 9:
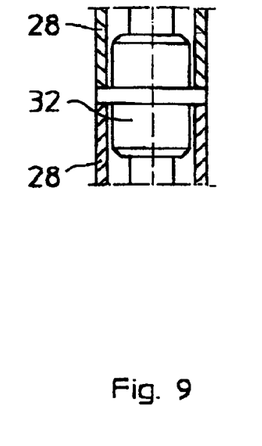
FIG. 9 shows a section of a constructive detail of the heat exchanger of FIG. 7.

The modular units 20 are stacked the one on the other on site during the assembly step of the reactor 1 so that the aforesaid rod-shaped uprights 28 may be connected between each other through quick clutching by means of connecting elements 32 shown in FIG. 9.

All the elements placed inside the device are free to undergo differentiated thermal expansions with respect to the elements thereto connected during any operation of the reactor.

The tubes 15 could even be singularly connected to the nozzles 18 and 19, and hence with a respective feed and withdrawal duct for the cooling/heating fluid for each tube 15. Preferably, however, each modular unit 20 is provided with respective connecting portions 22, 23 to said feed and discharge collectors 14, 16 for the cooling/heating fluid.

The connecting portions 22 and 23 are in turn distribution collectors interposed between a predetermined plurality of spirals and the collectors 14, 16, whereby such collectors respectively have the task of distributing and collecting the fluid entering the reactor from all the spirals.

The connections between spirals and collectors are formed by said portions 22, 23 that are connected to the main collectors through fluid paths which guarantee a flexibility of connection and avoid the use of expansion compensators to all advantage of the reliability.

Figure 3:
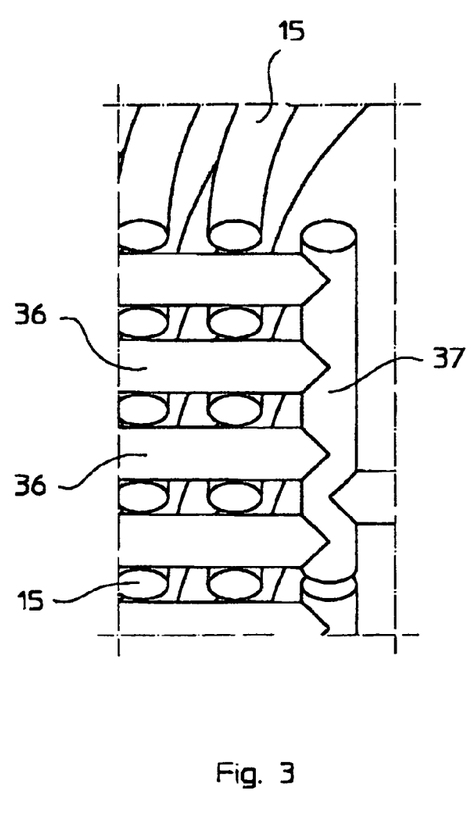
FIGS. 3 and 4 show schematic views in enlarged scale of constructive details of the component of FIG. 2, respectively.
Figure 4:
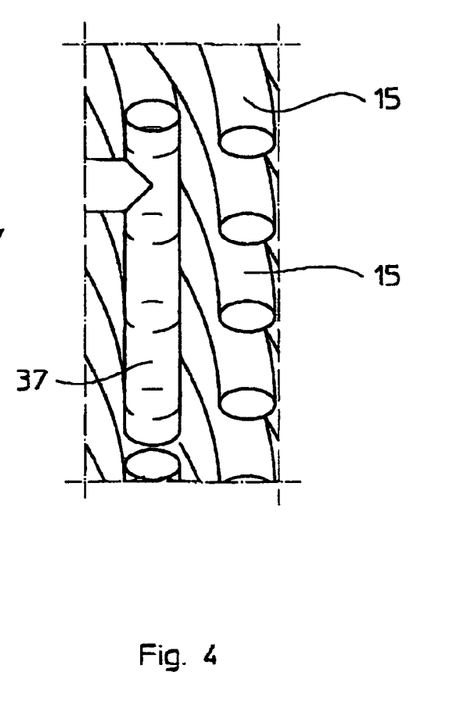

The tubes 15 are connected to the connecting portions 22, 23 through intermediate ducts 36 which, as shown in FIGS. 2 and 3, cross each modular unit 20 in radial direction between adjacent planes of spirals. Each intermediate duct 36 lead to further vertical connecting portions 37 to the ducts 22, 23 and make the fluid communication between each of the tubes 15 to the main inlet and outlet collectors possible.

In other words, each single spiral is connected at opposed ends thereof, on one end, to a connecting portion 22 that is in fluid communication with the inlet collector 14 and, on the other end, to a connecting portion 23 that is in fluid communication with the outlet collector 16.

In a preferred embodiment, such as when the reactor is of the gas/gas type, and has pretty relevant dimensions, four superimposed flat spirals lead to each connecting portion 22 or 23, respectively, and each modular unit 20 comprises three groups of four spirals with the respective portions 22, 23 of the connecting collector.

The modular units 20 are superimposed on one another on site during the assembly of the reactor. In order to adjust and superimpose correctly the modular units 20, guide ribs 27 are foreseen, extending longitudinally in a predetermined distanced relationship along an inner surface of the outer side wall 4 of the catalytic bed 3, as shown in FIG. 1.

Guides 33 (counter-means) are provided externally to each of the rod-like uprights 28 so to slide in each of the corresponding ribs 27 and guide on site the superimposition of each modular unit 20 on a underlying unit having the same structure.

The connection points between the portions of collector 22, 23 and the collectors 14, 16 are represented by holes 34, 35 formed in alignments in the collectors 14, 16 in predetermined distanced relationship in such a way to end up in correspondence of the top of the various modular units 20 during the construction step when they are stacked the one on the other. In FIG. 1 there is schematically illustrated this constructive feature.

The advantage of such arrangement consists in that the number of connections to be formed on site through welding or flanging (as shown in the drawings) is quite reduced, those connections being provided in very accessible locations.

It shall be noted that the resulting structure is very simple to realize with ensuing savings in terms of maintenance and investment costs with respect to the solutions of the prior art.

The embodiment shown in FIG. 5 is particularly advantageous in that having the tubes 15, all connected to each other, the resulting structure is particularly simple to be realized as it needs only one feed collector 14 and one withdrawal collector 16 for the cooling or heating fluid.

The reactor according to the present invention can be advantageously employed for carrying out substantially any kind of exothermic or endothermic reaction. Specifically, examples of exothermic reactions that may be well adapted to be carried out with the reactor of the present invention are methanol synthesis, ammonia synthesis, formaldehyde synthesis, organic oxidation (such as ethylene oxide); whereas examples of endothermic reactions may be: styrene and methylbenzene synthesis.

Hot water which transforms in steam at a high thermal level as well as fused salts and diathermic oils are preferably used as fluid for heat removal (in case of exothermic reactions). Analogous fluids may be also used for supplying heat in case of endothermic reactions.

The operation of the reactor 1 for carrying out exothermic or endothermic reactions according to the invention is briefly described hereinbelow.

It shall be noted that the pressure and temperature operational conditions for the gaseous reactants fed to the catalytic bed 3 as well those of the cooling or heating fluid passing through the tubes 15 are conventional for the specific kind of reaction that is intended to be carried out, and therefore will not be described with specific detail in the following description.

As a matter of example only, the operational conditions for methanol synthesis are given, i.e. synthesis pressure 50–100 bar, synthesis temperature 200–300° C., pressure of the steam generated 10–40 bar.

With reference to FIG. 5, a flow of gaseous reactants is fed to the catalytic bed 3 through the nozzle 9 and the gas inlet free space 8 from the top of the reactors and flows inside it through the perforated walls 4 and 5. The catalytic bed 3 is hence crossed with mainly radial (axial-radial) motion by the gaseous reactants that in contact with the catalyst react. The heat developed during the synthesis reaction or required for carrying out such reaction is removed by or supplied to the fluid passing through the tubes 15.

Such fluid is introduced in the reactor 1 through the collector 14 associated to the nozzle 18 and fed to the tubes 15 of the flat spirals through each connection element 22 of each modular unit 20. Then, starting from here, it crosses the tubes 15 of the respective group which are connected in correspondence of their free ends to the portions 23 of connection to the collector 16 and is evacuated from the reactor 1 through the nozzle 19.

Finally, the flow of reacted gases obtained in the catalytic bed 3, comes out from the latter through the perforated inner wall 5 and is collected in the central duct 10 and expelled by the reactor 1 through the nozzle 17.

From the presentation above, the numerous advantages achieved by the present invention arise clearly, in particular the provision of a reactor for carrying out exothermic or endothermic reactions of simple realization, reliable and at low investment and maintenance costs, that at the same time allows operating with a high conversion yield, low pressure drops, low energy consumption and with a high heat exchange efficiency between the gaseous reactants and the cooling or heating fluid.

Further on, the above described arrangement is advantageous under various aspects, among which we can highlight:
    lower mechanical load onto the catalyst that lays at the bottom of the bed and hence longer duration of the charge;
    lower mechanical loads on the internals;
    greater flexibility in the catalyst load/unload operations;
    easy inspection of the internals;
    thanks to the modularity of the internals, it is possible to have in stock one or more complete elements as spare parts, thus reducing to the minimum the duration of the plant shutdown even in case of possible damages to the internals.

What is claimed is:

1. A reactor for exothermic reactions, comprising:
    a shell (2) of substantially cylindrical shape;
    at least one catalytic bed (3) in the shell, comprising a perforated cylindrical outer side wall (4), which forms a free space (8) with said shell, and an inner side wall (5) coaxial to the outer side wall;
    a heat exchanger (13) in said bed (3), said heat exchanger being formed by a plurality of tubes (15) in the form of a spiral or a coil in fluid communication with feed and discharge collectors (14, 16) for a cooling fluid, wherein
    said heat exchanger (13) comprises a plurality of superimposed and structurally independent modular units (20), each of which includes at least two tubes (15) in the form of a spiral or a coil arranged transversally to the shell (2) axis and wrapping around a corresponding portion (25) of said inner side wall (5) of said catalytic bed, and provided with respective connecting portions (22, 23) to said feed and discharge collectors (14, 16).

2. Reactor according to claim 1, wherein each modular unit (20) also comprises an inner portion (25) of perforated cylindrical wall that builds up a piece or a portion of said inner side wall (5) of said catalytic bed.

3. Reactor according to claim 1, wherein the feed and discharge collectors (14, 16) extend parallel and are housed inside a central duct (10) bounded by the inner side wall (5) of the catalytic bed (3).

4. Reactor according to claim 1, wherein said modular units (20) further comprise connecting collectors (22, 23) in fluid communication on one end with each spiral of the tubes (15) in the form of a spiral or a coil of said heat exchanger (13) and, on the other end, with said feed and discharge collectors (14, 16).

5. Reactor according to claim 1, wherein said outer side wall (4) is provided towards its inner part with guide means (27) engageable in guide counter-means (33) provided externally of each modular unit (20).

6. Reactor according to claim 1, wherein the tubes (15) in the form of a spiral or a coil of each modular unit (20) are housed in an essentially basket-shaped structure provided with a predetermined number of supports (29) extending radially.

7. Reactor according to claim 6, wherein said basket-shaped structure comprises rays (29) for the support of the spirals having opposed ends hinged to rod-like uprights (28).

8. Reactor according to claim 7, wherein said rod-like uprights (28) are connectable to each other through a coupling during the superimposition of said modular units (20).

9. Reactor according to claim 1, wherein each modular unit (20) further comprises an outer portion of perforated cylindrical wall that builds up a piece or a portion of said outer side wall (4) of said catalytic bed (3).

10. Modular unit for heat exchangers (13) to be housed in catalytic beds (3) of reactors, for exothermic reactions, the modular unit comprising at least two tubes (15) in the form of a spiral or a coil arranged transversally to the unit axis, which wrap around an inner cylindrical side wall (5) of the catalytic bed (3), and respective feed and discharge collectors (22, 23) connected to said tubes (15) within said spiral or coil.

* * * * *